Patented Feb. 5, 1929.

1,700,790

UNITED STATES PATENT OFFICE.

LUDWIG EIFFLAENDER, OF LUDWIGSHAFEN-ON-THE-RHINE, GERMANY, ASSIGNOR TO GRASSELLI DYESTUFF CORPORATION, OF NEW YORK, N. Y., A CORPORATION OF DELAWARE.

PRODUCTION OF 1-DIAZO-ANTHRAQUINONE-2-CARBOXYLIC ACIDS.

No Drawing. Application filed November 23, 1926, Serial No. 150,373, and in Germany November 28, 1925.

I have found that 1-diazoanthraquinone-2-carboxylic acids can be obtained in a simple manner by treating, in the presence of water, with nitrous acid or compounds liberating nitrous acid the nitrogenous anthraquinone derivatives obtainable from 1-nitro-2-methylanthraquinone, or its substitution products according to the process described in the U. S. Patent 1,417,875 which anthraquinone derivatives are regarded to be anthraquinone-isoxazoles corresponding to the formula

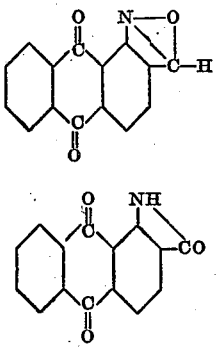

or

The diazo compounds produced in this manner may be used for example for the production of other anthraquinone-2-carboxylic acids, otherwise substituted in the 1-position, such as the technically important 1-chlor-anthraquinone-2-carboxylic acid or its derivatives for example the 5-nitro-derivative, and also for the production of azo dyestuffs. The 1-diazo-anthraquinone-2-carboxylic acids obtainable from anthraquinone-isoxazoles containing one or more further substituents in the anthraquinone nucleus are new compounds, whether in the isolated state or in the form of solutions of the diazonium salts.

The expression "diazo", when employed anywhere in the present application means the group $-N=N.X$, wherein X is any negative inorganic radical. The following examples will further illustrate methods of carrying out the invention in practice, but the invention is not limited to these examples. The parts are by weight.

Example 1.

10 parts of 1.2-anthraquinone-isoxazole obtainable in accordance with Example 1 of the U. S. Patent 1,417,875 are dissolved in 100 parts of concentrated sulfuric acid at about 50° centigrade. The equivalent quantity of nitrosyl-sulfuric acid is run into this solution, and the mixture is diluted with 100 parts of water, cooling being applied to keep the temperature down, preferably to between 40° and 60° centigrade.

A golden yellow solution is obtained, which may be filtered, if necessary, for the separation of any small quantities of insoluble precipitate. The solution contains the sulfate of 1-diazoanthraquinone-2-carboxylic acid, the yield of which is over 80 per cent of the theoretical amount.

Example 2.

10 parts of 5-nitro-1.2-anthraquinone-isoxazole obtainable in accordance with Example 2 of the U. S. Patent 1,417,875 are dissolved in 100 parts of concentrated sulfuric acid, at about 50° centigrade. The equivalent quantity of nitrosyl-sulfuric acid is run into this solution, and the whole is diluted with 200 parts of water, cooling being applied to keep the temperature down, preferably to between 40° and 60° centigrade.

A red colored solution is obtained, which may be filtered, if necessary, for the separation of any small quantities of insoluble precipitate. The solution contains the sulfate of 1-diazo- 5 - nitro-anthraquinone-2-carboxylic acid, which separates out, as yellowish-red leaflets, on cooling.

On treating the solution with a strongly hydrochloric acid solution of cuprous chloride, the hitherto unknown 1-chlor-5-nitroanthraquinone-2-carboxylic acid is obtained. By converting the acid into its magnesium salt and again liberating the acid, and recrystallization from nitrobenzol, the pure acid is obtained in the form of pale yellow needles with the melting point 301° centigrade.

Example 3.

10 parts of 1.2-anthraquinone-isoxazole obtainable in accordance with Example 1 of the U. S. Patent 1,417,875 are suspended in 100 parts of concentrated hydrochloric acid, whereupon nitrogen oxids are introduced into the suspension at 60° centigrade. On the termination of the reaction, the liquid is filtered by suction from the undissolved matter. The solution contains the hydrochloride of 1-diazoanthraquinone-2-carboxylic acid.

The original product may also be suspended in an aqueous solution of a nitrite, whereupon hydrochloric acid is run in while actively stirring. The treatment with nitrous acid may also be effected in another suitable medium.

I claim:

1. As new articles of manufacture, substituted 1-diazo-anthraquinone-2-carboxylic acids, "diazo" meaning the group $-N=N.X$, wherein X is any negative inorganic radical.

2. As a new article of manufacture, 1-diazo-5-nitro-anthraquinone-2-carboxylic acid, "diazo" meaning the group $-N=N.X$, wherein X is any negative inorganic radical.

3. The process of producing 1-diazo-anthraquinone-2-carboxylic acids which consists in treating a product obtainable by acting on a 1-nitro-2-methylanthraquinone with fuming sulfuric acid which products are probably 1.2-anthraquinone-isoxazoles, with nitrous acid in the presence of water.

In testimony whereof I have hereunto set my hand.

LUDWIG EIFFLAENDER.